United States Patent [19]

Tenney et al.

[11] 4,136,249

[45] Jan. 23, 1979

[54] RING-OPENED COPOLYMERS OF DIHYDRODICLOPENTADIENE, NORBORNENE OR ALKYLNORBORNENE, AND ACYCLIC OLEFIN

[75] Inventors: Linwood P. Tenney, Hudson; Parley C. Lane, Jr., Cuyahoga Falls, both of Ohio

[73] Assignee: The B. F. Goodrich Company, Akron, Ohio

[21] Appl. No.: 857,161

[22] Filed: Dec. 5, 1977

[51] Int. Cl.$^2$ .................... C08F 36/00; C08F 236/00; C08F 4/60; C08F 2/38
[52] U.S. Cl. ........................ 526/283; 526/84; 526/169; 526/281; 526/282; 526/916
[58] Field of Search ................. 526/280–283, 526/916

[56] References Cited

U.S. PATENT DOCUMENTS

| | | | |
|---|---|---|---|
| 3,629,221 | 12/1971 | Arakawa et al. | 526/283 |
| 3,778,420 | 12/1973 | Brown et al. | 526/281 |
| 3,781,257 | 12/1973 | Pampus et al. | 526/281 |
| 3,879,343 | 4/1975 | DeBrunner et al. | 520/281 |
| 4,002,815 | 1/1977 | Minchak | 526/916 |
| 4,025,497 | 3/1977 | Watta et al. | 526/282 |
| 4,025,708 | 5/1977 | Minchak et al. | 526/283 |

*Primary Examiner*—Herbert J. Lilling
*Attorney, Agent, or Firm*—Charles A. Crehore

[57] ABSTRACT

1,2-Dihydrodicyclopentadiene is copolymerized by ring opening with (1) norbornene, at least one alkylnorbornene or a mixture thereof and (2) at least one acyclic monoolefin or nonconjugated acyclic olefin. The copolymers can be calendered and thermoformed, for example, to make rigid automotive goods such as glovebox covers, hubcaps, and the like.

13 Claims, No Drawings

RING-OPENED COPOLYMERS OF DIHYDRODICLOPENTADIENE, NORBORNENE OR ALKYLNORBORNENE, AND ACYCLIC OLEFIN

BACKGROUND OF THE INVENTION

Cycloolefins can be polymerized through the olefin structure to yield polycycloaliphatics, or through a ring-opening process to yield unsaturated linear polymers. The latter process has particular appeal since the resulting polymers are sulfur-vulcanizable. Cyclopentene is a readily available ethylene production by-product, and considerable art has focused on the ring-opening polymerization and copolymerization of cyclopentene. Dicyclopentadiene is another readily available ethylene production by-product, but not as much consideration has been given in the prior art to dicyclopentadiene polymers. Recent U.S. Patents directed to cyclopentene and dicyclopentadiene polymers include U.S. Pat. Nos. 3,778,420, 3,781,257, 3,790,545, 3,853,830, and 4,002,815.

Norbornene (bicyclo[2.2.1]-hept-2-ene) and substituted norbornenes can be produced by Diels-Alder reaction of cyclopentadiene with selected olefins. U.S. Pat. No. 3,074,918 is directed to polymerization of cyclic olefins having at least one unsubstituted ring double bond and not more than one double bond in each ring, such as dicyclopentadiene, 1,2-dihydrodicyclopentadiene, norbornene, or substituted norbornenes. Other U.S. patents directed to norbornene and substituted norbornene polymers include U.S. Pat. Nos. 2,721,189, 2,831,037, 2,932,630, 3,330,815, 3,367,924, 3,467,633, 3,546,183, 3,836,593, 3,879,343, and 4,020,021.

Polymers of dicyclopentadiene alone or with acyclic monoolefins or nonconjugated acyclic olefins are difficult to process. Moreover, such polymers suffer from oxidative instability because of the presence of unsaturation in the dicyclopentadiene ring pendant from the polymer backbone. 1,2-Dihydrodicyclopentadiene polymers overcome the oxidative instability disadvantage (since the pendant ring contains no unsaturation), but processing difficulties remain.

New copolymers are desired having both improved oxidative stability and processability.

SUMMARY OF THE INVENTION 1,2-Dihydrodicyclopentadiene is copolymerized by ring opening with (1) from about 5 wt.% to about 95 wt.% based upon total copolymer weight of norbornene, at least one alkylnorbornene wherein each alkyl group contains from 1 to 20 carbon atoms, or a mixture thereof, and (2) from about 0.0001 to about 0.5 mole of at least one acyclic monoolefin or nonconjugated acyclic olefin per mole of total dihydrodicyclopentadiene, norbornene and alkylnorbornene. These copolymers have both improved oxidative stability and improved processability.

DETAILED DESCRIPTION 1,2-Dihydrodicyclopentadiene is copolymerized by ring opening with (1) from about 5 to about 95 wt.%, preferably from about 30 to about 95 wt.%, and more preferably from about 30 to about 75 wt.% of norbornene, at least one alkylnorbornene wherein each alkyl group contains from 1 to 20 carbon atoms, or a mixture thereof, and (2) from about 0.0001 to about 0.5 mole of at least one acyclic monoolefin or nonconjugated acyclic olefin per mole of total dihydrodicyclopentadiene, norbornene and alkylnorbornene.

Suitable norbornenes for use in the copolymers of this invention include both norbornene itself and alkylnorbornenes wherein each alkyl group contains 1 to 20 carbon atoms, more preferably 1 to 12 carbons, including 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, and 5-dodecyl-2-norbornene.

1,2-Dihydrodicyclopentadiene can be made by Diels-Alder reaction of cyclopentadiene with cyclopentene (67 J.A.C.S.723[1945]). Suitable alkylnorbornene monomers can be manufactured readily by Diels-Alder reaction of cyclopentadiene with selected olefins. For example, the Diels-Alder reaction of cyclopentadiene with 2-butene and 3-methyl-1-butene produces 5,6-dimethyl-2-norbornene and 5-isopropyl-2-norbornene respectively. Diels-Alder reaction of cyclopentadiene with 1-decene and 1-dodecene produces 5-octyl-2-norbornene and 5-decyl-2-norbornene respectively, and Diels-Alder reaction of cyclopentadiene with 1-tetradecene produces 5-dodecyl-2-norbornene.

At least one acyclic monoolefin or nonconjugated acyclic olefin is used having at least one hydrogen on each double-bonded carbon atom and containing 2 to 12 carbon atoms, more preferably 2 to 8 carbon atoms. It is believed that the acyclic olefins act as molecular weight modifiers which are required for the production of an easily workable and generally hydrocarbon-soluble polymer. By easily workable is meant millable and otherwise readily thermoplastic upon heating. Examples of suitable acyclic monoolefins include normal and branched 1-olefins such as 1-butene and 3-methyl-1-butene; 2-olefins such as 2-pentene and 4-methyl-2-pentene; and 3-olefins such as 5-ethyl-3-octene. Nonconjugated acyclic normal and branched olefins include diolefins such as 1,6-hexadiene; triolefins such as 1,4,7-octatriene; and the like. The preferred acyclic monoolefins are the 1-olefins of the type described above. Excellent results were obtained using 1-butene and normal 1-hexene.

Although the exact nature of the copolymeric structure is not understood, it is believed to be a linear, unsaturated polymer containing groups primarily of the following types in random order, where m and n are numbers which are proportional to the concentrations of the norbornene or alkylnorbornene and the dihydrodicyclopentadiene, respectively, and X is hydrogen or an alkyl group containing from 1 to 20 carbon atoms:

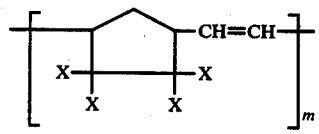

and

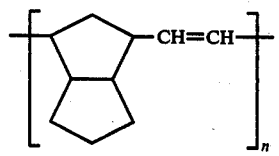

Minor amounts, i.e., up to about 20 wt.%, of still another olefinically unsaturated comonomer may also be used, including other norbornenes such as 5-vinyl-2-norbornene; and tetracyclododecene compounds having the formula

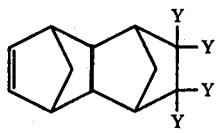

wherein Y is hydrogen or an alkyl group containing 1 to 20 carbon atoms, preferably from about 1 to 12 carbon atoms. Such tetracyclododecene compounds are typically by-products of the Diels-Alder reaction used to prepare norbornenes and may be present at varying levels depending upon reaction conditions used (e.g., dimethyltetracyclododecene in dimethylnorbornene).

A preferred catalyst for preparation of the copolymers of this invention comprises (1) a molybdenum or tungsten salt and (2) a dialkylaluminum iodide, an alkylaluminum diiodide, or a mixture of a trialkylaluminum compound with an iodine source.

Examples of useful molybdenum and tungsten salts include the halides such as chlorides, bromides, iodides, and fluorides. Specific examples of such halides include molybdenum pentachloride, molybdenum hexachloride, molybdenum pentabromide, molybdenum hexabromide, molybdenum pentaiodide, molybdenum hexafluoride, tungsten hexachloride, tungsten hexafluoride and the like. Other representative salts include those of acetylacetonates, sulfates, phosphates, nitrates, and the like. Mixtures of salts can also be used. The more preferred salts are the molybdenum halides, especially molybdenum pentahalides. Excellent results were obtained using $MoCl_5$.

The alkylaluminum compounds used in combination with the molybdenum or tungsten salts may be dialkylaluminum iodides, alkylaluminum diiodides, or a mixture of a trialkylaluminum compound with an iodine source. Each alkyl group may contain from 2 to about 12 carbon atoms, preferably from 2 to about 4 carbon atoms. Specific examples of such compounds include diethylaluminum iodide, ethylaluminum diiodide, propylaluminum diiodide and ethylpropylaluminum iodide. A mixture of a trialkylaluminum compound and an iodine source such as elemental iodine may also be used wherein each alkyl group is as defined above, e.g., a mixture of triethylaluminum and elemental iodine. Other iodine sources include methylene diiodide, potassium iodide, titanium tetraiodide, and the like. Excellent results were obtained using diethylaluminum iodide.

The molybdenum or tungsten salt is generally employed at a level from about 0.01 to about 50 millimoles per mole of total monomer, preferably from about 0.5 to about 10 millimoles per mole of total monomer. The organoaluminum compounds described above are generally used in a molar ratio of organoaluminum compound to molybdenum and/or tungsten salt(s) from about 10/1 to about 1/3, preferably from about 5/1 to about 3/1. Elemental iodine, when used, may be used in the range from about 0.1 mole to about 10 moles of iodine per mole of organoaluminum compound. When other sources of iodine are employed, sufficient iodine source is incorporated to provide the above concentration of elemental iodine in the catalyst.

In a preferred embodiment, the molybdenum or tungsten salt is dissolved in a solvent prior to incorporation into the polymerization mixture. In the absence of a solvent for the molybdenum or tungsten salt, the polymerization proceeds with some difficulty due to the presence of insoluble portions of salt. A preferred solvent for the molybdenum or tungsten salt comprises at least one alkyl ester of a saturated carboxylic or dicarboxylic acid. Use of an ester solvent has been found to produce a brief induction period of about 1 to about 5 minutes after addition of the molybdenum or tungsten salt to the monomer mixture. Such an induction period allows addition of all components of the reaction mixture before substantial polymerization begins. The result is more uniform process control and, ultimately, substantially gel-free polymers which are more readily recovered from the reaction vessel and are more easily processable than gelled polymers.

Suitable alkyl esters of saturated carboxylic or dicarboxylic acids typically contain from 2 to about 20 carbon atoms and may be substituted by 0 to 3 halogen atoms, preferably 0 or 1 halogen atoms. More preferably the ester solvent contains from 2 to 10 carbon atoms and 0 or 1 bromine or chlorine atoms, even more preferably 2 to 5 carbon atoms. The ester solvent should be liquid under a given set of reaction conditions in order to maintain the molybdenum or tungsten salt in solution during the reaction. The concentration of the molybdenum or tungsten salt in the ester solvent typically is from about 0.1 molar to about 1 molar. Examples of suitable alkyl esters of saturated carboxylic or dicarboxylic acids include methyl formate, ethyl formate, methyl chloroformate, ethyl chloroformate, butyl chloroformate, methyl acetate, ethyl acetate, isopropyl acetate, n-propyl acetate, n-butyl acetate, sec-butyl acetate, t-butyl acetate, isoamyl acetate, n-amyl acetate, hexyl acetate, methyl bromoacetate, ethyl bromoacetate, t-butyl bromoacetate, ethyl chloroacetate, methyl propionate, ethyl propionate, ethyl 2-bromopropionate, ethyl 3-bromopropionate, methyl 2-chloropropionate, ethyl butyrate, ethyl 2-bromobutyrate, ethyl 4-bromobutyrate, ethyl 2-bromoisobutyrate, methyl 4-chlorobutyrate, ethyl 4-chlorobutyrate, ethyl isovalerate, methyl 5-bromovalerate, ethyl 2-bromovalerate, ethyl 5-bromovalerate, methyl 5-chlorovalerate, ethyl caproate, ethyl octanoate, ethyl decanoate, ethyl laurate, diethyl oxalate, dimethyl malonate, diethyl malonate, diethyl methylmalonate, diethyl ethylmalonate, diethyl n-butylmalonate, diethyl dimethylmalonate, diethyl diethylmalonate, diethyl bromomalonate, diethyl chloromalonate diethyl succinate, diethyl glutarate, diethyl pimelate, diethyl suberate, adipic acid monomethyl ester, and the like.

Examples of more preferred solvents containing from 2 to 10 carbon atoms and 0 or 1 bromine or chlorine atoms include methyl formate, ethyl formate, methyl chloroformate, ethyl chloroformate, butyl chloroformate, methyl acetate, ethyl acetate, isopropyl acetate, n-propyl acetate, n-butyl acetate, sec-butyl acetate, t-butyl acetate, isoamyl acetate, n-amyl acetate, hexyl acetate, methyl bromoacetate, ethyl bromoacetate, t-butyl bromoacetate, ethyl chloroacetate, methyl propionate, ethyl propionate, ethyl 2-bromopropionate, ethyl 3-bromopropionate, methyl 2-chloropropionate, ethyl butyrate, ethyl 2-bromobutyrate, ethyl 4-bromobutyrate, ethyl 2-bromoisobutyrate, methyl 4-chlorobutyrate, ethyl 4-chlorobutyrate, ethyl isovalerate, methyl 5-bromovalerate, ethyl 2-bromovalerate, ethyl 5-bromovalerate, methyl 5-chlorovalerate, ethyl caproate, ethyl octanoate, diethyl oxalate, dimethyl malonate, diethyl malonate, diethyl methylmalonate, diethyl ethylmalonate, diethyl dimethylmalonate, diethyl bromomalonate, diethyl chloromalonate, diethyl succinate, diethyl glutarate, adipic acid monomethyl ester, and the like.

Examples of even more preferred solvents containing from 2 to 5 carbon atoms and 0 or 1 bromine or chlorine atoms include methyl formate, ethyl formate, methyl chloroformate, ethyl chloroformate, butyl chloroformate, methyl acetate, ethyl acetate, isopropyl acetate, n-propyl acetate, methyl bromoacetate, ethyl bromoacetate, ethyl chloroacetate, methyl propionate, ethyl propionate, ethyl 2-bromopropionate, ethyl 3-bromopropionate, methyl 2-chloropropionate, dimethyl malonate, and the like. Excellent results were obtained with ethyl acetate.

The above ester solvents may be used together with at least one inert cosolvent. The cosolvent typically constitutes from 0% to about 90% by weight of the total catalyst solvent weight. Additional cosolvent may also be used during polymerization. The additional cosolvent is typically up to about 500 times and more, preferably up to about 150 times, the total catalyst solvent weight. Suitable inert cosolvents include aliphatic or cycloaliphatic hydrocarbon cosolvents containing about 4 to 10 carbon atoms such as pentane, hexane, heptane, octane, cyclohexane, cyclooctane, and the like; aromatic hydrocarbon cosolvents containing 6 to 14 carbon atoms and which are liquid or easily liquified such as benzene, toluene, naphthalene and the like; and substituted hydrocarbons wherein the substituents are inert, such as dichloromethane, chloroform, chlorobenzene and the like. Benzene and toluene are excellent cosolvents.

A polymerization activator may be used but is not generally needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide as the activator, especially by using the organic peroxides such as benzoyl peroxide.

The activator may be employed in a range from about 0 moles to about 3 moles per mole of organoaluminum compound, more preferably from about 0 to about 1 mole per mole. The activator may be added at any point in the charging procedure, but it is more preferably added last.

The monomers may be added at any point in the charging procedure. A preferred charging procedure is as follows. The monomers and solvent(s) are added first to the reactor vessel. These ingredients may be added separately or as a mixture. The alkylaluminum iodide compound or mixture of trialkylaluminum compound and iodine source is added next, usually as a solution in a cosolvent such as benzene described heretofore. The molybdenum or tungsten salt is added next as a solution in a mixture of cosolvent and ester solvent described heretofore, followed by the activator if used.

Monomeric impurities such as water (in amounts larger than suitable for use as an activator) and the like should be removed prior to addition of the molybdenum or tungsten compound. The alkylaluminum iodide compound or mixture of trialkylaluminum compound and iodine source may be used to titrate the monomers or mixture of monomers and solvent until a color change from pink to colorless or slightly yellow is noted. A catalytically effective amount of alkylaluminum iodide compound or a mixture of trialkylaluminum compound and iodine source may then be added, followed by addition of the molybdenum or tungsten compound. The end point of the titration is typically difficult to pinpoint exactly. With minor impurities present, up to ten times the catalytically effect amount and more of the alkylaluminum iodide or mixture of trialkylaluminum compound and iodine source may be required to render the impurities harmless.

The mixing of catalyst components and the polymerization are preferably carried out in an inert atmosphere such as nitrogen and in the substantial absence of air or water. The polymerization may be performed as a batch or continuous operation and is conducted under sufficient pressure to keep the monomers and solvents in liquid state, the pressure required depending upon the reaction temperature. The particular ester solvent system selected must be liquid under the reaction conditions used. The reaction mixture in the reactor may be cooled or heated to polymerization temperature at the start of the additions or at any point during addition of the various reactants. Generally, polymerization temperatures from about $-80°$ C. to about 100° C. can be used, although the reaction generally proceeds especially well at about 20° C. to 75° C. The polymerization may be short-stopped by addition of alcohols, amines, alkanolamines or carboxylic acids such as ethanol, diethylamine, ethanolamine, acetic acid, and the like.

At the conclusion of the polymerization, the copolymers may be isolated by any method known to the art such as by direct drying under reduced pressure, by coagulation and precipitation using an alcohol such as methanol, ethanol, isopropanol and the like, or by steam or hot water stripping. The polymer is recovered and may be washed further with water or an alcohol and then dried.

The ring-opened copolymers of this invention have a unique combination of oxidative stability and processability possessed by neither copolymers of dihydrodicyclopentadiene with an acyclic monoolefin or nonconjugated acyclic olefin, nor by copolymers of norbornene or alkylnorbornene with an acyclic monoolefin or nonconjugated acyclic olefin.

The copolymers of this invention are high molecular weight products having dilute solution viscosities (DSV) ranging from about 0.2 to about 6, more generally from about 0.5 to about 3. By dilute solution viscosity is meant a value obtained using the following formula:

$$DSV = \frac{\ln(t/t_o)}{c}$$

wherein $T_o$ is toluene flow time and t is flow time of a polymer solution in toluene (both measured at 25° C. in toluene using an Ostwald-Fenske viscometer), and c is the concentration of the polymer solution (measured in grams of polymer per deciliter of toluene at 25° C.). In this case c was 0.25 gram of polymer per deciliter of toluene. The DSV is regarded as a measure of molecular weight and is reported in units of deciliters/gram.

The following examples illustrate the present invention more fully.

EXAMPLES

I. Test Methods

In each of the following examples dilute solution viscosity (DSV) was measured as defined heretofore. Vicat softening temperature ($T_s$) was determined according to ASTM D1525-76 using Rate B rate of temperature rise.

Gardner impact strength was tested by a method similar to ASTM D-2444, but using a 5/16 inch radius tup rather than the ¼ inch tup C, and using a flat test sheet rather than rigid pipe. A 2 or 4 lb. weight was dropped from varying heights onto the tup, which rested on the test sheet. The test sheet in turn lay flat upon a ⅝ inch diameter retaining ring. Failure occurred when the impacted tup poked a hole in the test sheet, or when the test sheet shattered. Gardner impact strength was the maximum work per thousandth inch of test sheet thickness (inch-pound/mil) capable of being impacted on the test sheet without failure.

II. Polymer Preparations

Reactant Solutions

In each of the following examples if the principal cosolvent was benzene, then selected other reagents were likewise dissolved in benzene. Similarly, if toluene was the principal cosolvent, certain other reagents were dissolved in toluene.

0.25 Molar diethylaluminum iodide solutions in dry benzene and in dry toluene were prepared. 14.9 grams normal 1-hexene was diluted to 100 ml in dry benzene and also in dry toluene. $MoCl_5$/ethyl acetate/dry benzene and $MoCl_5$/ethyl acetate/dry toluene solutions (0.05 molar $MoCl_5$ and 3.0 molar ethyl acetate in dry benzene and dry toluene) were prepared and aged. "Solution A" was a commercially available solution of 500 vol. parts ethanol, 5.2 vol. parts methanol, 10 vol. parts isopropanol, and 1 vol. part methyl isobutyl ketone. Solution A was used in the shortstopping and coagulation steps of the polymerizations.

EXAMPLE 1

DHDCPD/2-Norbornene/1-Hexene Copolymers

A 2/1 molar ratio of 1,2-dihydrodicyclopentadiene (DHDCPD) to 2-norbornene was used as follows to prepare the first DHDCPD/2-norbornene/1-hexene copolymer of example 1. 500 ml dry toluene cosolvent, 23.1 ml of a 2-norbornene solution (89.2 wt.% in toluene), 55.4 ml DHDCPD, 9 ml of the 1-hexene solution, and 6 ml of the diethylaluminum iodide solution were charged to a dry, nitrogen-purged quart bottle. 7.5 ml of the $MoCl_5$ solution was charged last with shaking. Polymerization occurred rapidly, and after 1 hour the reaction was shortstopped using a mixture of 1 ml ethanolamine, 3 ml Solution A, and 6 ml of an antioxidant solution (0.1 g/ml of Ethyl 330 in toluene; Ethyl 330 is 1,3,5-trimethyl-2,4,6-tris[3,5-di-t-butyl-2-hydroxybenzyl]benzene). The polymer cement was washed twice with 2 liters of water per wash. Each water wash was discarded. An additional 6 ml of the antioxidant solution was added to the washed cement, which then was coagulated using excess Solution A in a Waring blender. A solid, ring-opened DHDCPD/2-norbornene/1-hexene copolymer was recovered by filtering and vacuum drying and found to have a DSV (as defined heretofore) of about 1.41.

Other DHDCPD/2-norbornene/1-hexene copolymers were prepared by the above method with 1/1 and 1/2 DHDCPD/norbornene molar ratios using the following recipes respectively:

| Material | Recipe Amounts for 1/1 DHDCPD/ Norbornene Molar Ratio | Recipe Amounts for 1/2 DHDCPD/ Norbornene Molar Ratio |
| --- | --- | --- |
| Dry toluene | 500 ml | 500 ml |
| Norbornene solution | 36.8 ml | 52.2 ml |
| DHDCPD | 44 ml | 31.2 ml |
| 1-Hexane solution | 9 ml | 9 ml |
| Diethylaluminum iodide solution | 6 ml | 6 ml |
| $MoCl_5$ solution | 7.5 ml | 7.5 ml |

The latter two copolymers were solids having DSV's of about 1.65 and 1.96 respectively. Both were ring-opened DHDCPD/2-norbornene/1-hexene copolymers.

EXAMPLE 2

DHDCPD/5-Methyl-2-Norbornene/1-Hexene Copolymer

A 1/1 molar ratio of dihydrodicyclopentadiene (DHDCPD) to 5-methyl-2-norbornene was used as follows to prepare the DHDCPD/5-methyl-2-norbornene/1-hexene copolymer of example 2. 2500 ml dry toluene cosolvent, 207.5 ml DHDCPD, 182.5 ml 5-methyl-2-norbornene, 45 ml of the 1-hexene solution, and 30 ml of the diethylaluminum iodide solution were charged to a gallon bottle. 37.5 ml of the $MoCl_5$ solution was charged last with shaking. After 1.5 hours the reaction was shortstopped using a mixture of 5 ml ethanolamine, 15 ml Solution A, and 60 ml of an antioxidant solution (0.1 g/ml of 2,2'-methylenebis-[4-methyl-6-t-butylphenol] in toluene). The polymer was coagulated in several batches using excess Solution A in a Waring blender. About 350 grams of a solid, ring-opened DHDCPD/5-methyl-2-norbornene/1-hexene copolymer was recovered after filtration and vacuum drying. The copolymer was found to have a DSV of about 1.04.

EXAMPLE 3

DHDCPD/5,6-Dimethyl-2-Norbornene/1-Hexene Copolymers

A 2/1 molar ratio of DHDCPD to 5,6-dimethyl-2-norbornene was used to prepare the first DHDCPD/5,6-dimethyl-2-norbornene/1-hexene copolymer of example 3. 500 ml dry toluene cosolvent, 22.4 ml 5,6-dimethyl-2-norbornene, 50.2 ml DHDCPD, 9 ml of the 1-hexene solution and 6 ml of the diethylaluminum iodide solution were charged to a dry, nitrogen-purged quart bottle. 7.5 ml of the $MoCl_5$ solution was charged last with shaking. Polymerization was rapid, and after 1 hour the reaction was shortstopped using a mixture of 1 ml ethanolamine and 5 ml Solution A. 12 ml of an antioxidant solution (0.1 g/ml of 2,2'-methylenebis-[4-methyl-6-t-butylphenol] in toluene) was added, and the polymer cement was coagulated using excess Solution A in a Waring blender. 64.7 grams of a ring-opened DHDCPD/5,6-dimethyl-2-norbornene/1-hexene copolymer was recovered after filtration and vacuum drying. The copolymer was a solid having a DSV of about 1.20.

Other DHDCPD/5,6-dimethyl-2-norbornene/1-hexene copolymers were prepared by the above method with 1/1 and 1/2 DHDCPD/5,6-dimethyl-2-norbornene molar ratios using the following recipes respectively:

| Material | Recipe Amounts for DHDCPD/5,6-Dimethyl-2-Norbornene Molar Ratio of | |
|---|---|---|
|  | 1/1 | 1/2 |
| Dry toluene | 500 ml | 500 ml |
| 5,6-Dimethyl-2-norbornene | 34.2 ml | 46.2 ml |
| DHDCPD | 38.3 ml | 26 ml |
| 1-Hexene solution | 9 ml | 9 ml |
| Diethylaluminum iodide solution | 6 ml | 6 ml |
| MoCl$_5$ solution | 7.5 ml | 7.5 ml |

The latter two copolymers were solid, ring-opened DHDCPD/5,6-dimethyl-2-norbornene/1-hexene copolymers weighing 62 grams and 59.3 grams respectively. The copolymers had DSV's of about 1.05 and 1.13 respectively.

EXAMPLE 4

DHDCPD/5-Ethyl-2-Norbornene/1-Hexene Copolymers

A 2/1 molar ratio of DHDCPD to 5-ethyl-2-norbornene was used to prepare the first DHDCPD/5-ethyl-2-norbornene copolymer of example 4. 500 ml dry toluene cosolvent, 26.2 ml 5-ethyl-2-norbornene, 52.3 ml DHDCPD, 10 ml of the 1-hexene solution, and 6 ml of the diethylaluminum iodide solution were charged to a dry, nitrogen-purged quart bottle. 7.5 ml of the MoCl$_5$ solution was charged last with shaking. The reaction was shortstopped after 1 hour with a mixture of 1 ml ethanolamine, 3 ml Solution A, 6 ml of the Ethyl Antioxidant 330 Solution used in example 1, and 100 ml toluene. The polymer cement was allowed to stand for about 16 hours and then washed, coagulated, filtered and vacuum dried as in example 1. About 60.8 grams of a solid, ring-opened DHDCPD/5-ethyl-2-norbornene/1-hexene copolymer was obtained. The copolymer had a DSV of about 0.97.

Two other DHDCPD/5-ethyl-2-norbornene/1-hexene copolymers were prepared by the above method with 1/1 and 1/2 DHDCPD/5-ethyl-2-norbornene/1-hexene molar ratios using the following recipes respectively:

| Material | Recipe Amounts for DHDCPD/5-Ethyl-2-Norbornene Molar Ratio of | |
|---|---|---|
|  | 1/1 | 1/2 |
| Dry toluene | 500 ml | 500 ml |
| 5-Ethyl-2-norbornene | 40.1 ml | 52.3 ml |
| DHDCPD | 39.8 ml | 28.5 ml |
| 1-Hexene solution | 10 ml | 10 ml |
| Diethylaluminum iodide solution | 6 ml | 6 ml |
| MoCl$_5$ solution | 7.5 ml | 7.5 ml |

The latter two copolymers were solid, ring-opened DHDCPD/5-ethyl-2-norbornene/1-hexene copolymers weighing 60.8 grams and 61.2 grams respectively, and with respective DSV's of about 1.60 and 1.84.

EXAMPLE 5

DHDCPD/5-Hexyl-2-Norbornene/1-Hexene Copolymers

A 4/1 molar ratio of DHDCPD to 5-hexyl-2-norbornene was used to prepare the first DHDCPD/5-hexyl-2-norbornene/1-hexene copolymer of example 5. 500 ml dry toluene cosolvent, 21.3 ml 5-hexyl-2-norbornene, 56.2 ml DHDCPD, 10 ml of the 1-hexene solution, and 6 ml of the diethylaluminum iodide solution were charged to a dry, nitrogen-purged quart bottle. 7.5 ml of the MoCl$_5$ solution was charged last with shaking. Polymerization was rapid, and after 1 hour the reaction was shortstopped using a mixture of 1 ml ethanolamine, 3 ml Solution A, and 6 ml of the Ethyl Antioxidant 330 solution used in example 1. The polymer cement was washed twice with 2 liters of water per wash. Each water wash was discarded. An additional 6 ml of the antioxidant solution was added to the washed cement, which was then coagulated in a Waring blender using excess Solution A. 66.1 grams of a solid, ring-opened DHDCPD/5-hexyl-2-norbornene/1-hexene copolymer was recovered by filtering and vacuum drying. The copolymer had a DSV of about 1.15.

Other DHDCPD/5-hexyl-2-norbornene/1-hexene copolymers were prepared by the above method with 2/1, 1/1, and 1/2 DHDCPD/Hexylnorbornene molar ratios using the following recipes respectively:

| Material | Recipe Amounts for DHDCPD/Hexylnorbornene Molar Ratio of | | |
|---|---|---|---|
|  | 2/1 | 1/1 | 1/2 |
| Dry toluene | 500 ml | 500 ml | 500 ml |
| 5-Hexyl-2-norbornene | 34.1 ml | 48.8 ml | 62.1 ml |
| DHDCPD | 45.0 ml | 32.1 ml | 20.5 ml |
| 1-Hexene solution | 10 ml | 10 ml | 10 ml |
| Diethylaluminum iodide solution | 6 ml | 6 ml | 6 ml |
| MoCl$_5$ solution | 7.5 ml | 7.5 ml | 7.5 ml |

The latter copolymers were ring-opened DHDCPD/5-hexyl-2-norbornene/1-hexene copolymers weighing 55.3 grams, 64.5 grams, and 66.1 grams respectively, and having DSV's of 1.32, 1.37, and 1.31 respectively.

EXAMPLES 1-5

The copolymers of this invention in examples 1 through 5 were [dihydrodicyclopentadiene/norbornene or alkylnorbornene/1-hexene] copolymers and were found to process better than DHDCPD/1-hexene copolymers, and to have a balance of oxidative stability and processability not possessed by dicyclopentadiene/1-hexene copolymers.

Thermal and impact properties of the copolymers of this invention were superior to those of [norbornene or alkylnorbornene/1-hexene] copolymers. For example, a 5,6-dimethyl-2-norbornene/1-hexene copolymer was found to have a Gardner impact strength of 1.27 in-lbs/mil and a Vicat softening temperature of 82° C., while the DHDCPD/5,6-dimethyl-2-norbornene/1-hexene copolymers of example 3 had considerably better Gardner impact strengths and Vicat softening temperatures. Other test data as well for examples 1 to 5 is summarized in TABLE I.

TABLE I

| Example | Alkyl Norbornene Monomer | Dihydrodicyclopenta-diene/Alkylnorbornene Molar Ratio | Dilute Solution Viscosity (DSV) | Gardner Impact in lbs/mil at 27° C. | Vicat ($T_s$), °C. |
|---|---|---|---|---|---|
| 1 | Norbornene | 2/1 | 1.41 | 2.08 | 121 |
|   |            | 1/1 | 1.65 | 2.23 | 103 |
|   |            | 1/2 | 1.96 | 2.16 | 85 |
| 2 | Methylnorbornene | 1/1 | 1.03 | — | — |
| 3 | Dimethylnorbornene | 2/1 | 1.20 | 2.50 | 129 |
|   |            | 1/1 | 1.05 | 2.53 | 118 |
|   |            | 1/2 | 1.13 | 2.91 | 108 |
| 4 | Ethylnorbornene | 2/1 | 0.97 | 2.29* | 99 |
|   |            | 1/1 | 1.60 | 2.69* | 93 |
|   |            | 1/2 | 1.84 | 2.13* | 72 |
| 5 | Hexylnorbornene | 4/1 | 1.15 | 3.10 | 87 |
|   |            | 2/1 | 1.32 | 2.88 | 65 |
|   |            | 1/1 | 1.37 | 1.33 | 41 |
|   |            | 1/2 | 1.31 | 0.83 | 41 |

*Maximum possible value under given test conditions.

The copolymers of this invention are thermoplastics which can be compounded and, if desired, cured with conventional fillers, extenders, plasticizers, antioxidants, oil extenders, cure accelerators, cross-linking or curing agents, pigments and stabilizers. The copolymers and compounds therefrom can be calendered and thermoformed, for example, to make rigid automotive goods such as glovebox covers, hubcaps and the like.

We claim:

1. A ring-opening polymerized copolymer comprising polymerized units of (a) 1,2-dihydrodicyclopentadiene, (b) from about 5 wt.% to about 95 wt.% of norbornene, at least one alkylnorbornene wherein each alkyl group contains from 1 to 20 carbon atoms, or a mixture thereof, and (c) from about 0.0001 to about 0.5 mole of at least one acyclic monoolefin or nonconjugated acyclic olefin per mole of total norbornene, alkylnorbornene and dicyclopentadiene, said acyclic monoolefin or nonconjugated acyclic olefin containing from 2 to 12 carbon atoms and having at least one hydrogen on each double-bonded carbon atom, said copolymer containing groups primarily of the following types in random order, where m and n are numbers which are proportional to the concentration of the norbornene or alkylnorbornene and the dihydrodicyclopentadiene, respectively, and X is hydrogen or an alkyl group containing from 1 to 20 carbon atoms:

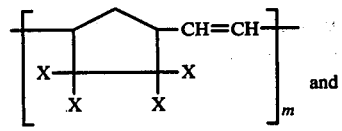

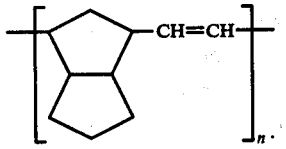

2. A copolymer of claim 1 containing polymerized units of said norbornene, alkylnorbornene or mixture thereof in an amount from 30 to about 95 wt.% based upon total copolymer weight.

3. A copolymer of claim 2 containing polymerized units of said norbornene, alkylnorbornene or mixture thereof in an amount from 30 to about 75 wt.% based upon total copolymer weight.

4. A copolymer of claim 3 wherein said acyclic monoolefin is a 1-olefin or 2-olefin containing from 2 to 8 carbon atoms.

5. A copolymer of claim 4 wherein monomer (b) is norbornene, and said 1-olefin is 1-butene or 1-hexene.

6. A copolymer of claim 4 wherein monomer (b) is methylnorbornene.

7. A copolymer of claim 6 wherein said methylnorbornene is 5-methyl-2-norbornene, and said 1-olefin is 1-butene or 1-hexene.

8. A copolymer of claim 4 wherein monomer (b) is dimethylnorbornene.

9. A copolymer of claim 8 wherein said dimethylnorbornene is 5,6-dimethyl-2-norbornene, and said 1-olefin is 1-butene or 1-hexene.

10. A copolymer of claim 4 wherein monomer (b) is ethylnorbornene.

11. A copolymer of claim 10 wherein said ethylnorbornene is 5-ethyl-2-norbornene, and said 1-olefin is 1-butene or 1-hexene.

12. A copolymer of claim 4 wherein monomer (b) is hexylnorbornene.

13. A copolymer of claim 12 wherein said hexylnorbornene is 5-hexyl-2-norbornene, and said olefin is 1-butene or 1-hexene.